United States Patent

[11] 3,586,341

| [72] | Inventors | Robert L. Whittaker<br>Gwynedd Manor;<br>Joseph Donofry, Bromall; Thorval L.<br>Berg, Warminster, all of, Pa. |
|---|---|---|
| [21] | Appl. No. | 833,265 |
| [22] | Filed | June 16, 1969 |
| [45] | Patented | June 22, 1971 |
| [73] | Assignee | Green Tweed & Co., Inc.<br>North Wales, Pa. |

[54] SEALING CONSTRUCTION
9 Claims, 6 Drawing Figs.

| [52] | U.S. Cl. | 277/124 |
|---|---|---|
| [51] | Int. Cl. | F16j 15/18 |
| [50] | Field of Search | 277/123, 124 |

[56] References Cited
UNITED STATES PATENTS

| 2,264,147 | 11/1941 | Dunlevy | 277/124 |
|---|---|---|---|
| 2,665,151 | 1/1954 | Fisher et al. | 277/123 X |
| 2,817,544 | 12/1957 | Von Der Nuell | 277/123 |
| 3,397,893 | 8/1968 | Kampert | 277/124 X |

*Primary Examiner*—Laverne D. Geiger
*Assistant Examiner*—Robert I. Smith
*Attorney*—Seidel, Gonda & Goldhammer

ABSTRACT: A sealing construction is disclosed which comprises a stack of sealing rings. Each of the sealing rings has radially inwardly and outwardly directed legs. Each of the legs has a configuration so as to provide for line contact at a sealing edge.

PATENTED JUN22 1971 3,586,341
SHEET 1 OF 2
PRIOR ART FIG.1
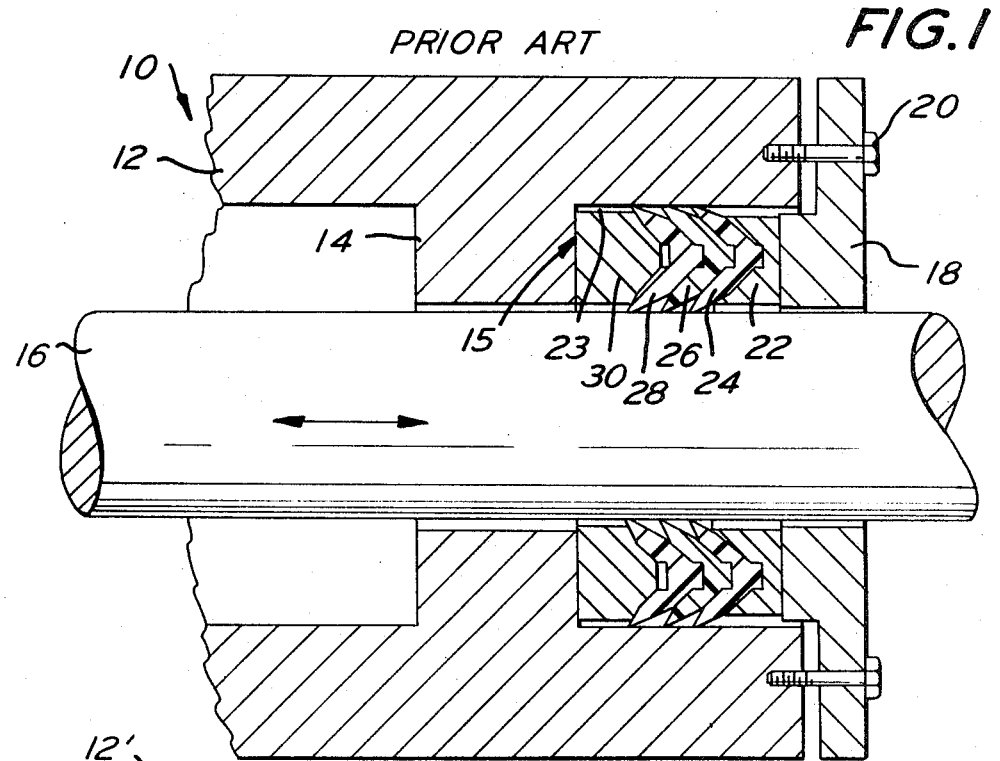
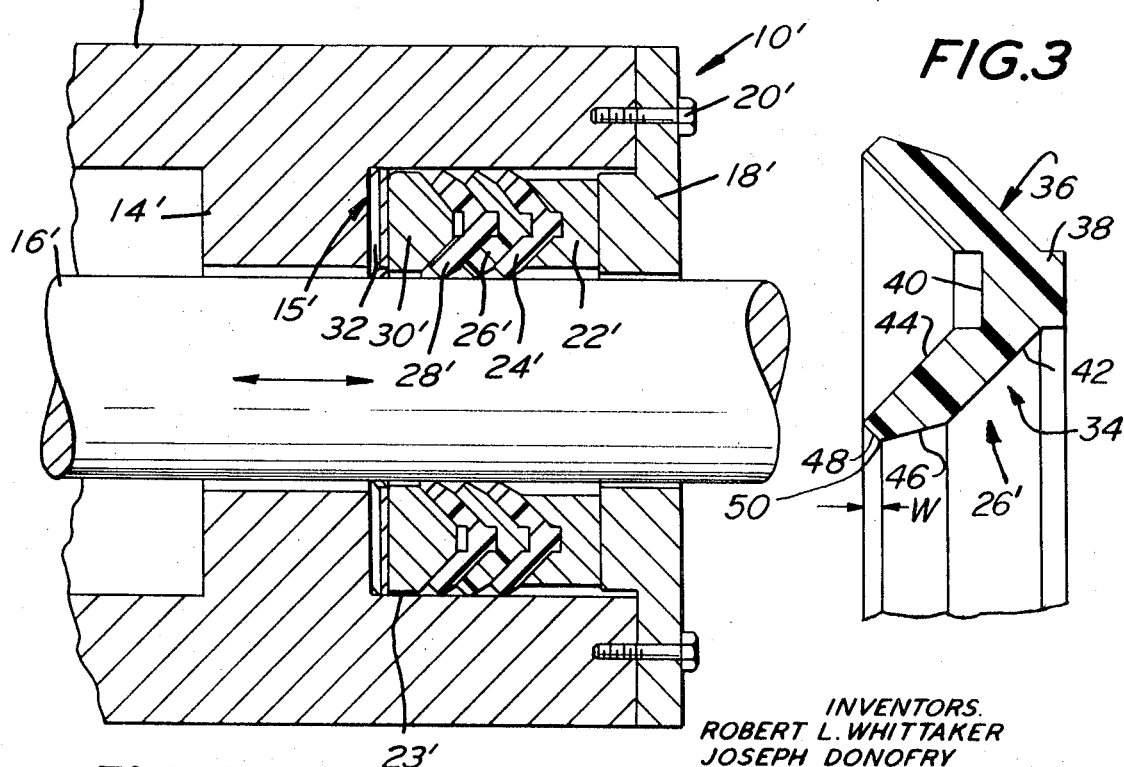
FIG.2
FIG.3
INVENTORS.
ROBERT L. WHITTAKER
JOSEPH DONOFRY
THORVAL L. BERG
BY
Seidel, Gonda & Goldhammer
ATTORNEYS.

PATENTED JUN22 1971
3,586,341
SHEET 2 OF 2
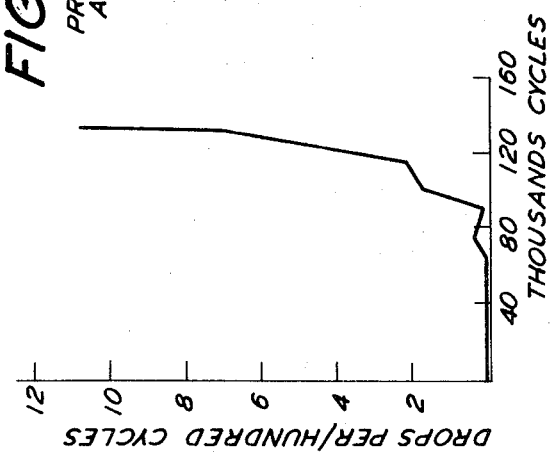
FIG. 6 PRIOR ART
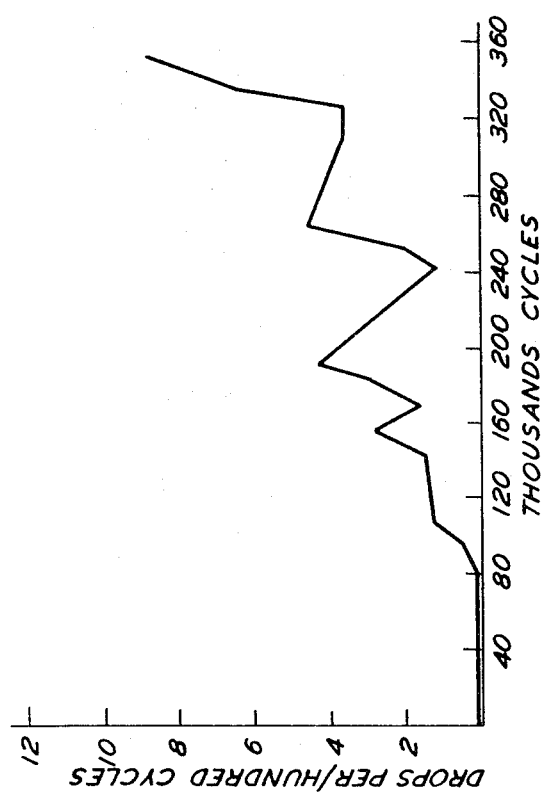
FIG. 5 PRIOR ART
FIG. 4
INVENTORS.
ROBERT L. WHITTAKER
JOSEPH DONOFRY
THORVAL L. BERG
BY
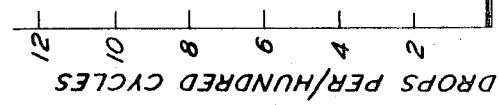
Seidel, Gonda & Goldhammer
ATTORNEYS.

SEALING CONSTRUCTION

The present invention is directed to a sealing construction, and more particularly, to a sealing construction of a type disclosed in U.S. Pat. No. 1,246,089. The present invention is an improvement over the sealing construction disclosed in said patent.

In accordance with the present invention, a plurality of sealing rings are stacked so as to have inwardly and outwardly disposed legs symmetrically arranged. Each of the legs have a line contact sealing edge defined by surfaces converging with respect to the axes of the rings. Mating adapter or spreader rings are provided at the ends of the stack. Preferably a spring means is provided for biasing the stack in an axial direction. As will be made clear hereinafter, the sealing rings of the present invention unexpectedly provide for a service life which is approximately thrice the service life obtainable with the sealing constructions of the prior art.

It is an object of the present invention to provide a novel sealing construction.

It is another object of the present invention to provide a novel stack of sealing rings.

It is another object of the present invention to provide a stack of sealing rings which will have a service life in excess of 600,000 cycles.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a longitudinal sectional view of a sealing construction in accordance with the prior art.

FIG. 2 is a longitudinal sectional view of a sealing construction in accordance with the present invention.

FIG. 3 is a sectional view showing the cross section of the sealing ring construction in accordance with the present invention on an enlarged scale.

FIG. 4 is a graph showing the drops per 100 cycles compared with the cycles in thousands, and pertaining to the prior art.

FIG. 5 is a graph showing the drops per 100 cycles compared with the cycles in thousands, and pertaining to the prior art.

FIG. 6 is a graph showing the drop per 100 cycles compared with the cycles in thousands, pertaining to the prior art.

Referring to the drawing, wherein like numerals indicates like elements, there is shown in FIG. 1 a longitudinal cross section of a sealing construction in accordance with the prior art and designated generally as 10.

As shown in FIG. 1, there is provided a cylinder having an end wall 14 defining one end of a pressure chamber. A piston rod or other circular member 16 extends through a coaxial hole in the end wall 14 and reciprocates in the direction of the arrow.

The right-hand end of the cylinder 12 to the right of the end wall 14 is provided with a cavity 23 within which is disposed a stack of sealing rings. The right-hand end of the cavity is closed by an end cap 18 having a boss which enters the cavity. Cap 18 is coupled to the end face of cylinder 12 by means of bolts 20.

The stacked sealing ring construction within cavity 23 includes a female spreader or adapter ring 22 in contact with the boss on cap 18. A male spreader or adapter ring 30 is in contact with surface 15 on wall 14. Ring 22 performs the function of an antiextrusion ring. Between the adapter rings 22 and 30, there is provided a plurality of annular sealing rings designated as 24, 26 and 28. By adjusting the bolts 20, the cap 18 is utilized to force the ring 22 inwardly toward the ring 30 and thereby cause the inner and outer peripheral legs of the sealing rings to contact the axially directed wall of cavity 23 and the outer periphery of rod 16. The rings 24—28 are arranged so that fluid pressure from cylinder 12 expands their legs and enhances said contact. A wave spring could be provided between the wall 14 and the male adapter 30, if desired.

Two different samples of the prior art sealing construction shown in FIG. 1 have been tested for the purpose of determining leakage and life span. The results of the tests for the two samples are shown in FIGS. 5 and 6. In FIGS. 5 and 6, the leakage in the form of drops per hundred cycles has been plotted against the number of cycles in thousands.

In FIG. 5, the sample failed after approximately 190,000 cycles. In FIG. 6, the sample failed after approximately 130,000 cycles.

In FIGS. 2 and 3, there is illustrated the improvement of the present invention. The sealing construction of the present invention is designated generally as 10' and conforms identically to that described above except as will be made clear hereinafter. Hence, corresponding structure is provided with corresponding primed numerals.

As shown more clearly in FIGS. 2 and 3, the shape of the sealing rings has been modified, the cap 18' is bolted to the end face of the cylinder 12', and a spring means is preferably provided between the wall 14' and the spreader ring 30'. The spring means is preferably in the form of an undulating wave spring 32. One embodiment of spring 32 has a free height of approximately 0.218 inch and a compressed height of approximately 0.109 inch so that it may exert a pressure force of approximately 58 pounds. Other types of springs and other arrangements of the cap 18' may be used and do not form a part of the present invention.

As shown more clearly in FIG. 3, sealing ring 26' which is typical of the sealing rings is shown on an enlarged scale. Sealing ring 26' has an inwardly directed leg 34 and an outwardly directed leg 36. The legs 34 and 36 are identical and symmetrically arranged. Hence, only leg 34 will be described in detail.

The ring 26' includes an annular cavity 40 between the legs 34 and 36 and a coaxially extending annular stem 38. The size of stem 38 corresponds to the size of cavity 40.

Leg 34 is defined by parallel angularly disposed surfaces 42 and 44 which are substantially the same length and are interconnected at their ends by converging surfaces 46 and 48 which meet at a sealing edge 50. Surfaces 46 and 48 converge with respect to the axis of the sealing ring 26'. Surface 46 is longer than surface 48 so as to define a preferred included angle of approximately 115°. The included angle must be at least 90° and less than 180°.

The sealing edge 50 on each sealing ring makes line contact with the outer periphery of rod 16'. The corresponding sealing edge on leg 36 makes line contact with the axially extending wall of cavity 23'. With a sealing construction in accordance with FIGS. 2 and 3, tests were run to indicate the leak rate in drops per 100 cycles per number of cycles in thousands. The test results are shown in FIG. 4. The sealing construction of the present invention did not fail by providing a leakage rate in excess of four drops per 100 cycles until after 690,000 cycles. Hence, the life span of the sealing construction shown in FIGS. 2 and 3 unexpectedly triples or quadruples the life of the sealing ring. The reason why the sealing construction of FIGS. 2 and 3 unexpectedly has such a substantially longer life span is not known with certainty, but is believed to be due to the result of the relationship between surfaces 46 and 48 and the sealing edge 50 having line contact to effect a sealing action.

The sealing rings 24', 26', and 28' may be made from a wide variety of materials including rubber and polymer plastic materials. By way of example, the preferred embodiments of the sealing rings are made from carboxylated Buna N which is a carboxylate butadiene-acrylonitrile copolymer. A suitable carboxylated Buna N. material is sold commercially as Hycar 1072 by B. F. Goodrich Chemical Co.

While a rod seal has been shown, it is within the scope of the present invention to utilize the sealing construction in a groove in a movable piston member.

It has been found that the use of a single sealing ring of the new construction, as exemplified by the ring 26', in place of the ring 26 in the prior art construction will result in a significant increase in the life span of the seal shown in FIG. 1. However, it is preferred to utilize the sealing construction shown in FIG. 2 in order to obtain the optimum life span of the sealing construction.

The present invention may be embodied in other specific forms without departing from the spirit or essential attributes thereof.

I claim:

1. A sealing construction comprising a stack of nested sealing rings, at least one of the rings having inwardly and outwardly disposed legs symmetrically arranged, said inwardly directed legs having a line contact sealing edge defined by surfaces that diverge with respect to the axes of the rings, the angle included by said surfaces being at least 90° and less than 180°, and a spreader ring disposed at each end of the stack and mating with the adjacent sealing ring.

2. A sealing construction in accordance with claim 10 including a housing within which the stack of rings is disposed, a rod extending through the rings with the sealing edge on the inwardly disposed legs being in line contact with the outer periphery of the rod, the sealing edge on the outwardly disposed legs being in line contact with said housing, a spring means for biasing one spreader ring toward the other, said housing having a wall, said spring means being between said wall and said one spreader ring, and the housing having a portion in contact with the other of the spreader rings to oppose the bias of the spring means.

3. A sealing construction in accordance with claim 10 wherein said rings are made from carboxylate butadiene-acrylonitrile copolymer.

4. A sealing construction in accordance with claim 10 wherein the sealing rings are Y-shaped in cross section with a cavity between the legs on each ring receiving an annular coaxial stem on an adjacent ring.

5. A sealing construction in accordance with claim 10 wherein said included angle is approximately 115°.

6. A sealing ring for use in a sealing construction comprising an annular body portion having inwardly and outwardly directed legs symmetrically arranged with each leg having generally parallel top and bottom surfaces oblique with respect to the axis of the ring, the terminal ends of the surface being connected to converging surfaces, the converging surfaces meeting at a sealing edge adjacent to but spaced from the terminal end of the top surface, the angle between said converging surfaces being approximately 115°, one of said converging surfaces being longer than the other, said ring being made from a polymeric material, and means on the body to facilitate stacking the ring with corresponding rings.

7. A sealing ring in accordance with claim 6 wherein said last-mentioned means includes coaxial cavity and stem on opposite sides of the body, the stem and cavity being of substantially the same size so that the cavity may receive the stem on an adjacent ring, with the cavity being disposed between the legs.

8. A sealing ring in accordance with claim 7 wherein said top surface extends from the upper edge of said cavity.

9. A sealing ring in accordance with claim 6 wherein said top and bottom surfaces are of substantially the same length.